United States Patent [19]

Deutscher et al.

[11] Patent Number: 4,550,469
[45] Date of Patent: Nov. 5, 1985

[54] WINDSHIELD WIPER ASSEMBLY

[75] Inventors: Hans-Christian Deutscher, Ludwigsburg; Alfred Kohler; Hans Prohaska, both of Bietigheim-Bissingen; Karl-Friedrich Schubert, Bietigheim-Bissingen, all of Fed. Rep. of Germany

[73] Assignee: ITT Industries, Inc., New York, N.Y.

[21] Appl. No.: 318,739

[22] Filed: Nov. 6, 1981

[30] Foreign Application Priority Data

Dec. 3, 1980 [DE] Fed. Rep. of Germany ....... 3045504

[51] Int. Cl.[4] .............................................. A47L 1/02
[52] U.S. Cl. .................................. 15/250.34; 403/260
[58] Field of Search ............. 15/250.34, 250.31, 250.3, 15/250.27, 250.13, 250.14; 403/258, 260

[56] References Cited

U.S. PATENT DOCUMENTS

| 2,097,662 | 11/1937 | Hennecke et al. | 15/250.31 |
| 2,443,976 | 6/1948 | Baldwin | 15/250.34 |
| 2,619,668 | 12/1952 | Sivacek | 15/250.34 |
| 2,941,230 | 6/1960 | Scriven et al. | 15/250.34 |
| 3,656,208 | 4/1972 | Kato et al. | 15/250.34 |

FOREIGN PATENT DOCUMENTS 2727454 12/1978 Fed. Rep. of Germany ... 15/250.34

*Primary Examiner*—Philip R. Coe
*Assistant Examiner*—Frankie L. Stinson
*Attorney, Agent, or Firm*—Donald J. Lenkszus

[57] ABSTRACT

A windshield wiper assembly including a one-piece plastic shaft and crank coupling the drive unit to the driven assembly.

19 Claims, 4 Drawing Figures

WINDSHIELD WIPER ASSEMBLY

BACKGROUND OF THE INVENTION

This invention pertains to vehicular windshield wiper installation.

Most of today's standard wiper installations are driven by a motor via a gear inserted behind said motor in the following manner: The armature shaft of an electric motor carries a worm mating with a worm wheel being accomodated in a gear housing. The worm wheel may be considered as the drive unit for a driven motor shaft which as a separate part is fixed on the worm wheel torsionally firm and guided in a bearing bore of the gear casing. On the driven-end side of this shaft a crank is secured as a driven unit. The crank co-operates with at least one push rod which is articulated on a pivot pin of a further crank. This second crank can again be designated as drive unit for a wiper shaft which is guided in a wiper bearing fixed on the body of the vehicle and which on its driven-end side carries a fastening member of a wiper arm. In this manner the rotary movement of the armature of the electric motor and thus the rotary movement of the driven motor shaft is transformed into a pendulum movement of the wiper shaft and thus of the wiper.

Up to now, the various parts of this gear have been mostly produced in separate courses of manufacture and been secured on each other later, thus requiring further phases of operation. Normally the driven motor shaft is made of steel and is pressed into the worm wheel made of laminated fabric material. Also the actual wiper shaft as well as the crank fastened on it and the pivot pin are ususally made of steel, whereby these parts have mostly been riveted, caulked or welded with each other. The production of such wiper installations is therefore relatively complicated and expensive. Due to the steel parts predominantly used the weight is relatively high.

The invention is therefore based on simplifying production of the various gear parts of such a wiper installation in a way that, in comparison to known wiper installations, advantages with regard to costs and weight are achieved.

German patent application No. 1,196,523 published for opposition describes a wiper installation in which a shaft bored through eccentrically is formed on a worm wheel and the shaft is guided in a bearing of a gear casing. However, in contrast to the hints in the description of this prior publication, the shaft does not transmit the torque from the worm wheel to the motor crank. The crank is fixed on a crank shaft mounted in the eccentric bore. The crank shaft may be coupled torsionally firm with the worm wheel via a locking mechanism. Thus, the shaft end only serves to support the worm wheel and to displace the crank center of rotation when the torsionally firm coupling between worm wheel and crank shaft is discontinued for the purpose of entering the wipers into a so-called submerged parking position.

In German Pat. No. 2,010,922, the wiper shaft and the crank are developed in one piece as a metal support forming an angle, whereby the wiper shaft portion is coated with plastic material by injection molding. The end portion of the metal support facing the crank is bent in a hook-shaped manner and a plastic ball member for articulating a push rod is injection-molded thereon. Thus, the torque is carried by the drive unit, namely the crank, to the driven unit, namely the wiper arm and its link respectively, via a metal wiper shaft.

In the known versions, both the motor shaft and the wiper shaft have a conical, externally toothed portion and a following portion with an external thread. Because the diameter of the shaft is made as small as possible, due to the costs involved and in order to save weight, the number of teeth on the outer circumference of the conical portion is relatively small as well. Therefore, the motor crank and the fastening member of the wiper arm respectively can often not be secured in exactly the right position with respect to the shaft. Besides the necessary torque often can not be transmitted via this small number of teeth. This is the reason why it is necessary to brace the driven unit with the shaft by means of a nut screwed onto the external thread portion.

SUMMARY OF THE INVENTION

In accordance with the principles of the invention, the shaft and drive unit are made in one piece of plastic material. Thus, the constructional unit of shaft and drive unit can be produced in a single course of manufacture. With the use of suitable plastic materials a subsequent treatment of the bearing surface of the shaft can be saved. A considerable reduction of weight is obtained without affecting sturdiness and stability with suitable dimensions. Test have shown that the required operational torques are obtained.

Further, in accordance with the invention and in contrast to the structure of aforementioned German patent application 1,196,523, the plastic shaft formed in one piece onto the worm wheel directly transmits the torque from the drive unit, i.e., the worm wheel, to the driven unit, i.e., the motor crank.

In contrast to the structure of German patent 2,010,922 and in accordance with the invention, the torque is directly transmitted to the wiper arm via a crank integrally formed on the wiper shaft of plastic material.

Still further in accordance with the invention the diameter of the plastic shaft is increased for stability. At the same time a greater number of teeth is provided on the outer circumference of the shaft to transmit the torque. Additionally, the driven unit can be secured much more exactly relative to the shaft. The fastening member for fixing the driven unit onto the shaft may be located in an area within the wiper shaft, thereby reducing the overall height. The fastening member has the sole purpose of axially securing the driven element onto the wiper shaft. For wiper installations with high torques to be transmitted, in addition to the form closure through the toothing, a frictional connection may be necessary for the transmission of the torque.

The plastic shaft preferably has a passing bore which at least in one section widens conically. This is advantageous with respect to the injection-moulding process because an easier removal from the mould is possible and because the wall thickness achieved will be constant with out any sinks or bubbles.

When a suitable plastic material is used, this plastic shaft can directly be guided in a plastic bearing. It is also possible to support this plastic shaft directly in the bearing of the gear casing which may be made of zinc diecasting material.

In applying the basic idea of the invention to a wiper bearing it is possible to fix the shaft in axial direction with respect to the bearing without additional means like sealing rings. Thereby the provided bayonet-type locking enables a time-saving assembly.

BRIEF DESCRIPTION OF THE DRAWING

The invention may be better understood from a reading of the following detailed description in conjunction with the drawing in which:

FIG. 1A is a full cross-section of the wiper bearing of FIG. 1;

DETAILED DESCRIPTION

Figure 1:
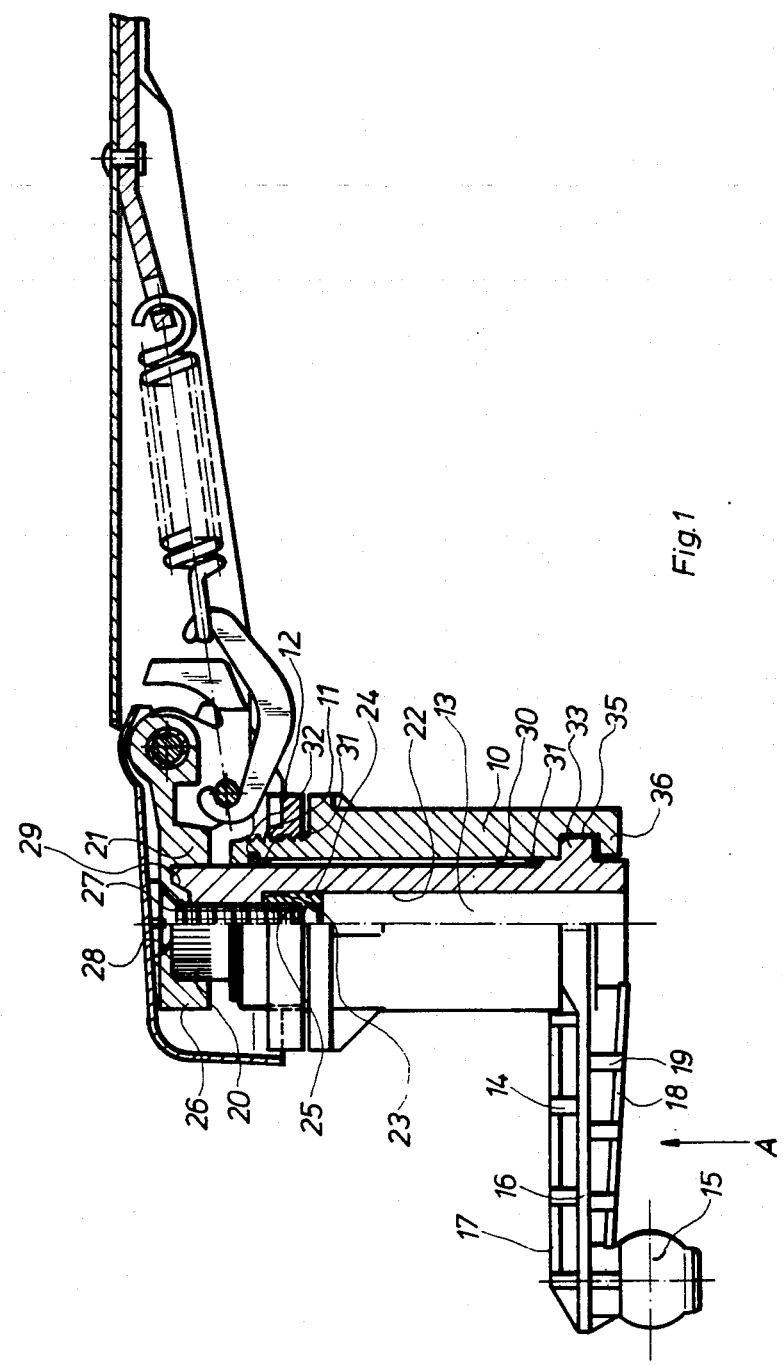
FIG. 1 is a section through a wiper bearing in accordance with the invention.
Figure 2:
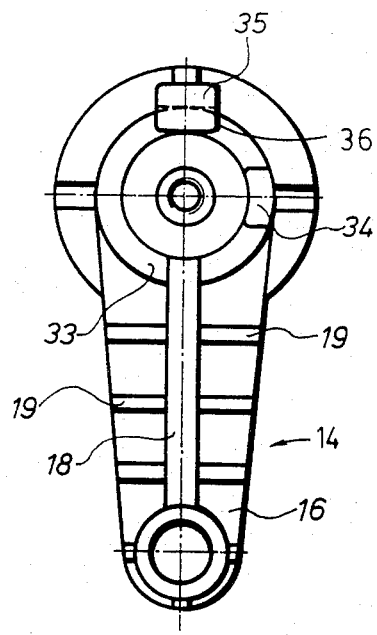
FIG. 2 is a view in direction of arrow A in FIG. 1.

In FIGS. 1 and 1A a wiper bearing bushing made of plastic material is designated by 10, which on its driven-end side has a portion 11 with an external thread on which a fastening nut 12 may be screwed. The wiper bearing bushing 10 is fixed in a known manner on a motor vehicle body (not shown in detail). In the wiper bearing bushing 10 a wiper shaft 13 is rotatably guided. The wiper shaft 13 is made of plastic material in one piece with a crank 14 and a ball-type pivot pin 15. The plastic material may be a glass reinforced or mineral reinforced plastic material with self-lubricating quantities. Good results have been achieved with a polyamide material For stability the crank 14, which in the embodiment according to FIGS. 1 and 2 may be regarded as drive unit, consists of a basic support 16 with two longitudinally extending and vertically projecting cross pieces 17, 18, whereby the basic support 16 and the cross pieces 17, 18 are reinforced via ribs 19. At the driven-end side the wiper shaft 13 has a portion 20 with an external toothing for securing a driven unit in the proper position. The driven unit is a fastening member 21 of a wiper arm (shown in part). The wiper shaft 13 has an axial bore 22 which in a portion on the driven end conically widens toward the crank 14, with a diameter bigger than the diameter of the bore in a portion on the driven end, so that a circumferential stop shoulder 23 is formed. From the side of fthe crank a nut 24 is pressed into bore 22 in direction of arrow A, which nut 22 rests against the stop shoulder 23 and is fixed in the bore 22 in a manner protected against twisting. The outer surface of the nut 24 can be axially knurled or be provided with barbs in order to ensure also a fixing in axial direction of the wiper shaft 13.

From FIG. 1 can be seen that the spacing between the front surface at the driven end of the wiper shaft 13 and the nut 24 is only slightly bigger than the spacing between the front face at the driven end of the wiper shaft 13 and the neighboring front face of the wiper bearing bushing 10. The nut is thus located in the area of the wiper bearing bush, but the spacing to the front face of the wiper shaft 13 is relatively small, so that a relatively short screw 25 is needed as a fastening element to fix the fastening member 21 in axial direction.

The fastening member 21 has a cup-shaped portion 26 with an internal toothing which is slipped over the toothed portion 20 of the wiper shaft 13. The bottom of this cup-shaped portion 26 rests directly upon the front face of the wiper shaft 13. The bottom is provided with a bore 27 having a conically pressed-in rim area 28. This pressed-in rim area 28 exactly matches the correspondingly conically widened portion of the wiper shaft bore ending at the front side. This conically widened portion of the bore is designated by 29 in FIG. 1. In this manner a stable connection between the fastening member and the wiper shaft 13 is achieved with a low overall height, for the screw 25 can now be a countersunk screw. The screw head does not project at all or only slightly over the basic surface of the cup-shaped portion 26 of the fastening member 21. In this embodiment according to FIG. 1 the fastening member, namely the screw 25, is thus anchored within the bore of the wiper shaft 13, so that the wiper shaft as a whole may be shorter than that of known embodiments and does not project over the fastening member to the opposite side of the bearing bush. The screw connection is only necessary to fix the fastening member axially on the wiper shaft, whereas the transmission of the torque is effected by the toothing between the wiper shaft and the fastening member. A press fit of the fastening member on the wiper shaft is not necessary; this is why the toothed or corrugated portion 20 is not conically developed, but of course can be developed in such a way. Instead of the screw connection connecting elements with radially resilient detents can be used which grip behind the stop shoulder 23. The outside diameter of the wiper shaft 13 made of plastic material is approximately twice as big as the diameter of conventional metal wiper shafts. Correspondingly also the number of teeth in the end portion 20 of the wiper shaft 13 is greater, so that the fastening member 21 can be fixed onto the wiper shaft in exactly the predetermined position relative to the crank.

The wiper shaft 13 is directly guided in the wiper bearing bushing 10 without additional slide bearings. The gap shown in the drawing between wiper bearing bush 10 and wiper shaft 13 is a longitudinal groove 30, which can receive a lubricant. Two sealing rings 31 at the top and at the bottom prevent a leaking of the lubricant from this longitudinal groove and an ingress of water during operation. The lower sealing ring 31 is fixed in axial direction by corresponding studs on the wiper shaft and in the bore of the wiper bearing bush 10. In order to secure the upper sealing ring 31 a stud in the bore of the wiper bearing bush 10 is used as well as a holding ring 32 which can be sealed at several places.

The constructional unit of wiper shaft, crank and pivot pin is easily locked and fixed in the wiper bearing bush 10. For this purpose the wiper shaft 13 has a circumferential flange 33 with a recess or notch 34. The flange 33 rests against the drive-end front face of the bearing bush 10. A bolt 35 is formed on the wiper bearing bush 10, which bolt can grip through this recess or notch 34 and in the operating positions grips behind the flange 33 with a hook-shaped stud 36 after the crank has been twisted. By matching locking elements, which are formed in one piece on the wiper bearing bush and the constructional unit of wiper shaft, crank and pivot pin respectively, the wiper shaft can thus easily be secured against axial displacement within the bore of the wiper bearing shaft. Thereby no additional sealing rings are necessary.

Thus in the area of the wiper shaft the gear of a wiper installation is altogether much simpler with regard to production technique, because several parts can be produced in one course of manufacture. The nut 34 can also be inserted in the tool, so that the subsequent pressing-in operation can be saved.

Figure 3:
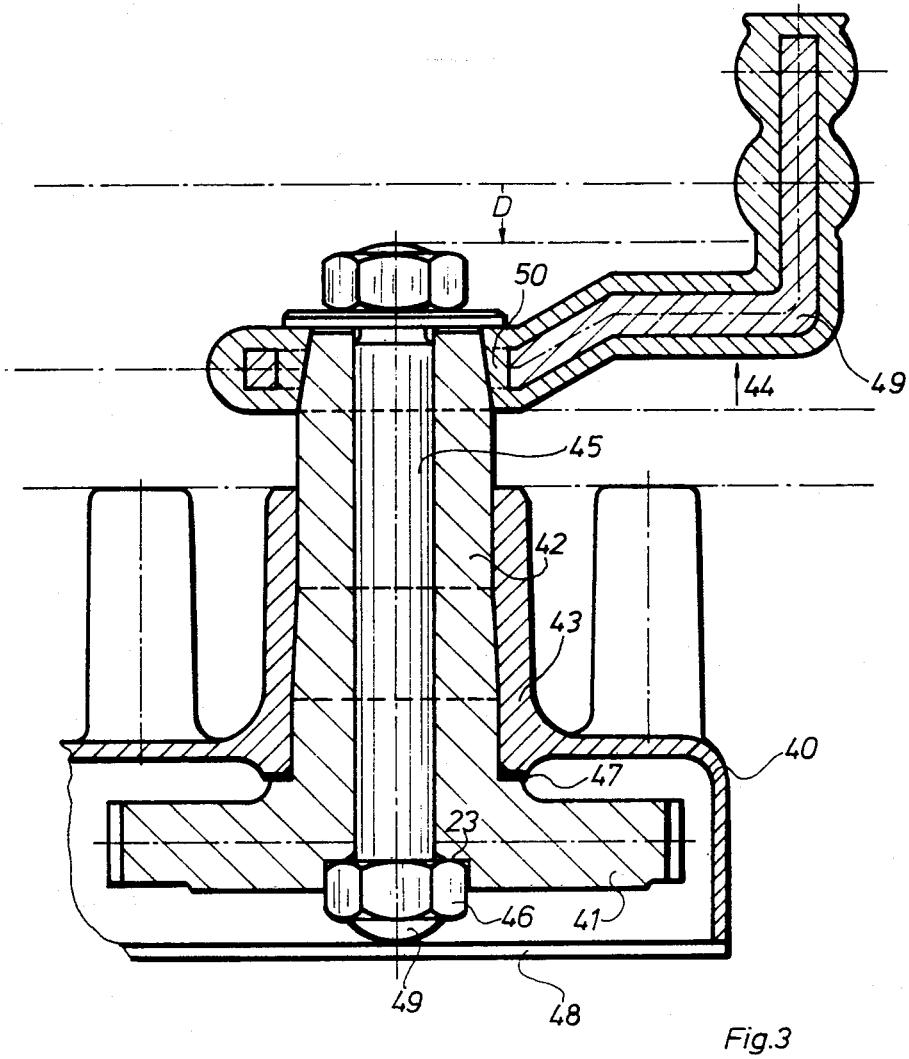
FIG. 3 is a section through an embodiment of a driven motor shaft produced in one piece with a worm wheel.
Figure 4:
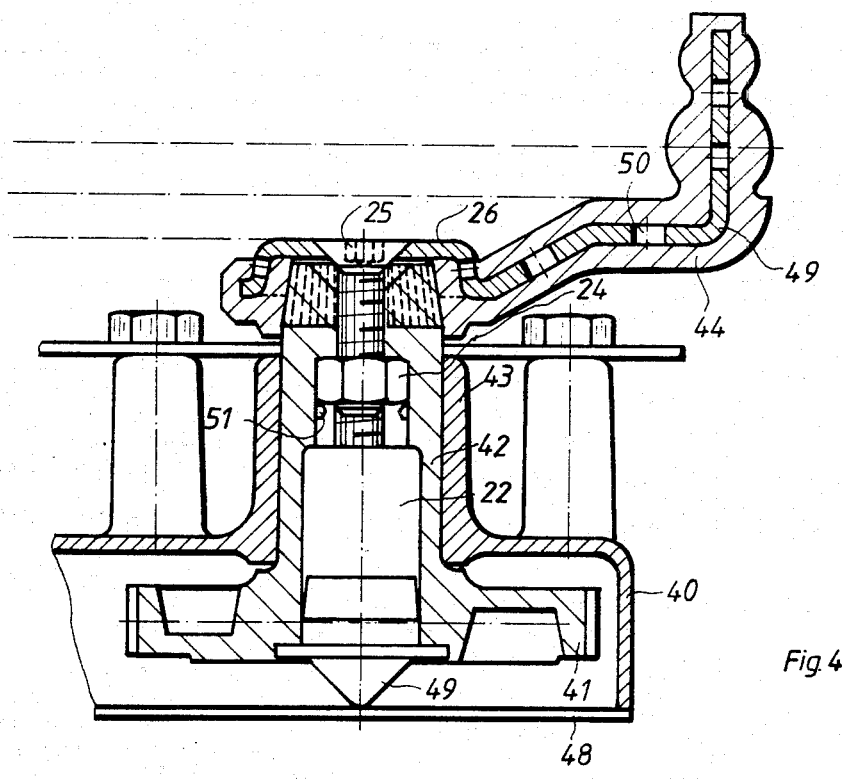
FIG. 4 is a section through a driven motor shaft of another embodiment.

In FIGS. 3 and 4 two additional embodiments of the basic idea of the invention are shown which refer to the development of the gear in the area of the wiper motor. One recognizes a gear casing designated by 40, which can be made of zinc die-casting material, but also of plastic material. This gear casing 40 receives a worm wheel 41 which in a known manner, which is not shown in detail in the drawing, is driven by a worm. In this embodiment the worm wheel 41 may be regarded as drive unit, the worm wheel 41 is made in one piece with the driven motor shaft 42. This driven motor shaft 42 is rotatably guided directly in a bearing bush 43 formed on the gear casing 40. This driven motor shaft 42 again transmits the torque directly onto a motor crank 44 which in the embodiment according to FIG. 3 is put onto an axially knurled portion of the driven motor shaft 42 with a conical end. A pivot pin 45 which cooperates with a cap nut 46 again serves to axially secure the motor crank 44 relative to the driven shaft 42.

The constructional unit of worm wheel 41 and driven shaft 42 on one side directly supports on the studs of the bearing bush 43 via a spacing disk 47. On the other side it is supported on a cover 48 closing the gear housing 40. In this manner a displacement of the driven shaft in axial direction is prevented without additional structural parts.

In the embodiment according to FIG. 3 the gudgeon 45 penetrates nearly the entire bore 22 of the driven shaft 42. The stop shoulder 23 for the cap nut 46 is located in the area of the worm wheel 41 at a spacing from lower bottom surface in such a way that the cap nut with its crowned portion 49 projects from the worm wheel 41 and directly rests upon the gear casing cap 48.

In contrast thereto in the version according to FIG. 4 the nut 24 is again submergedly arranged in the bore 22 which at the bottom is closed by a pressed-in stopper 49 which with its crowned stud rests upon the gear housing cap 48. Similar to the crank of FIG. 1 the motor cranks can be made of plastic material in one piece. Because, however, usually two wipers are driven via the motor crank and the strain is accordingly much bigger, said motor crank will preferably be strengthened by a steel reinforcement 49 as this is shown in FIGS. 3 and 4. FIG. 4 shows an improved embodiment in which the steel reinforcement 49, similar to the fastening member of FIG. 1, has a cup-shaped portion 26 whose bottom directly rests upon the front surface of the driven motor shaft 42. Thereby the use of the countersunk screw becomes possible again and the overall height is reduced considerably, as can be easily seen in a comparison between FIGS. 4 and 3. The distance D between the equatorial plane of the lower ball-type pivot pin and the head of the fastening screw 25 in the version of the embodiment according to FIG. 4 is approximately twice as big as in the embodiment according to FIG. 3 whose kind of fastening approximately corresponds to that of the prior art.

It has been indicated in FIG. 3 and 4 that the steel reinforcement 49 can have apertures 50 which serve to anchor the plastic material with the steel reinforcement reliably. At 51 detents have been indicated in the bore 22 of the driven shaft 42, which detents have the purpose of preventing, in case of inexpert mounting, the nut 24 from falling through the bore 22 in downward direction.

What is claimed is:

1. A windshield wiper assembly for use with a motor drive unit comprising:
   a wiper arm;
   an elongated bushing member fixedly mounted relative to said wiper arm and having a central bore;
   a shaft extending through and guided in said bore;
   a driven unit coupled to one end of said shaft and to said wiper arm;
   a drive member integrally formed on a portion of the other end of said shaft and extending radially outward therefrom, said drive member being coupled to said motor drive unit;
   said shaft and said drive member being formed of plastic material;
   said other end portion including a circumferential flange having an upper surface engaging a bottom surface of said bushing;
   said bushing including a downwardly extending hook-shaped portion, said hook-shaped portion and said bottom surface cooperatively restraining axial movement of said shaft relative to said bushing;
   said flange including a notch, said notch being of such dimensions and positioned on said flange such that said integrally formed drive member and shaft are assembled with said bushing by positioning said notch over said hook-shaped portion, by moving said shaft into said bushing until said flange upper surface engages said bushing bottom surface, and by rotating said integrally formed drive member and shaft relative to said bushing such that said hook-shaped portion engages said flange bottom surface.

2. A wiper assembly in accordance with claim 1, wherein said driven unit includes a recess receiving said one end of said shaft;
   said one end includes toothing on its external surface, said toothing securing said driven unit in fixed position relative to said shaft and transmitting torque from said shaft to said driven unit;
   said shaft having a longitudinal bore; and
   wherein said assembly further comprises a fastening member anchored in said longitudinal bore for securing said driven unit in axial direction of said shaft.

3. A wiper assembly in accordance with claim 2, comprising a nut in said bore fixed in a manner protected against twisting; and said fastening member comprises a screw in engagement with said nut.

4. A wiper assembly in accordance with claim 3, wherein said bore includes a first portion of one diameter and a second portion of smaller diameter, a shoulder being formed between said first and second portions, said nut engaging said shoulder.

5. A windshield wiper assembly in accordance with claim 4, wherein said first bore portion widens toward said drive unit in conical fashion.

6. A windshield wiper in accordance with claim 4, wherein said one end of said shaft is spaced from said nut a distance only slightly larger than the distance between said one end and the neighboring face of said bushing member.

7. A windshield wiper assembly in accordance with claim 2, wherein said bore in the end portion of said shaft adjacent said driven unit conically widens, said recess having a portion engaging said end portion.

8. A windshield wiper assembly in accorance with claim 2, wherein said shaft is directly guided in said bore.

9. A windshield wiper assembly in accordance with claim 8, wherein said bushing comprises plastic material of the same type as said wiper shaft.

10. A windshield wiper assembly in accordance with claim 8, wherein said bushing comprises zinc die-casting material.

11. A windshield wiper assembly in accordance with claim 2 wherein:
said drive member comprises a crank having at least one pivot pin, and said driven unit comprises a fastening member of a wiper arm;
and said wiper shaft, said crank and said pivot pin are integrally formed as one unit comprising plastic material.

12. A windshield wiper assembly in accordance with claim 11, wherein said bushing has locking elements and said drive member has matching locking elements engaging said locking elements such that said wiper shaft is secured to said bushing in said axial direction.

13. A windshield wiper assembly in accordance with claim 1, wherein said driven unit has a cup-shaped portion having an internal toothing, said cup-shaped portion being sliped over said one end of said shaft, the bottom of said cup-shaped portion having a second bore with a conically bulged rim area.

14. A windshield wiper assembly in accordance with claim 2, wherein said drive member comprises a worm wheel of a wiper motor, said worm wheel; and said driven unit comprises a crank coupled to said wiper.

15. A windshield wiper assembly in accordance with claim 14, wherein said worm wheel and shaft are supported in axial direction on one end by a front face of said bushing, said motor drive unit having a gear assembly including a gear casing cap supporting the other end of said worm wheel and shaft.

16. A windshield wiper assembly in accordance with claim 15, wherein said fastening member comprises a cap nut secured in said bore in a manner protected against twisting, said cap nut having a crowned portion extending beyond said worm wheel and resting in said gear casing cap.

17. A windshield wiper assembly in accordance with claim 15, wherein said fastening member comprises a nut, said bore being countersunk to receive said nut; and said assembly including a stopper pressed into said countersunk bore, said stopper having a crowned stud resting on said gear casing cap.

18. A windshield wiper assembly in accordance with claim 14, wherein said crank comprises plastic material.

19. A windshield wiper assembly in accordance with claim 18, wherein said crank includes a steel reinforcement member.

* * * * *